(12) United States Patent
Nakazato et al.

(10) Patent No.: US 9,291,180 B2
(45) Date of Patent: Mar. 22, 2016

(54) CLIP AND MEMBER MOUNTING STRUCTURE WITH SAME

(71) Applicant: Piolax, Inc., Yokohama-shi (JP)

(72) Inventors: Hiroshi Nakazato, Yokohama (JP); Nobuya Shinozaki, Yokohama (JP)

(73) Assignee: PIOLAX, INC., Yokohama-shi, Kanagawa (JP)

( * ) Notice: Subject to any disclaimer, the term of this patent is extended or adjusted under 35 U.S.C. 154(b) by 0 days.

(21) Appl. No.: 14/376,833

(22) PCT Filed: Nov. 9, 2012

(86) PCT No.: PCT/JP2012/007206
§ 371 (c)(1),
(2) Date: Aug. 5, 2014

(87) PCT Pub. No.: WO2013/118211
PCT Pub. Date: Aug. 15, 2013

(65) Prior Publication Data
US 2015/0033511 A1    Feb. 5, 2015

(30) Foreign Application Priority Data

Feb. 10, 2012  (JP) .................................. 2012-027281

(51) Int. Cl.
*F16B 2/20* (2006.01)
*F16B 5/10* (2006.01)
*F16B 21/04* (2006.01)

(52) U.S. Cl.
CPC ... *F16B 2/20* (2013.01); *F16B 5/10* (2013.01); *F16B 21/04* (2013.01); *Y10T 24/346* (2015.01)

(58) Field of Classification Search
CPC . B60R 19/24; B60R 2019/247; F16B 5/0642; F16B 21/125; F16B 5/0657; F16B 2/20; F16B 5/10; F16B 21/04; Y10T 403/7152; Y10T 403/11; Y10T 24/346

USPC ............ 24/351; 411/508–511, 174, 175, 352
See application file for complete search history.

(56) References Cited

U.S. PATENT DOCUMENTS 2,798,277 A * 7/1957 Flora .............................. 411/549
3,123,880 A * 3/1964 Barry et al. .................... 411/352

(Continued)

FOREIGN PATENT DOCUMENTS

| CN | 100540356 | 9/2009 |
| JP | 62-49011 | 3/1987 |

(Continued)

OTHER PUBLICATIONS

International Search Report (ISR) (PCT Form PCT/ISA/210), in PCT/JP2012/007206 dated Jan. 22, 2013.

(Continued)

*Primary Examiner* — Robert J Sandy
*Assistant Examiner* — Rowland Do
(74) *Attorney, Agent, or Firm* — McGinn IP Law Group PLLC

(57) ABSTRACT

A member mounting structure joins together a first member which has a first mounting hole and a second member which has a second mounting hole. The member mounting structure is configured in such a manner that a pin has a shaft section and a radial protrusion section which protrudes in the radial direction from the shaft section. A clip, which is formed by punching and press-forming a metallic plate and which is used to grip the first member, has: a first plate section which has formed therein a first insertion hole into which the shaft section of the pin is inserted; a second plate section which faces the first plate section; and a connection section which connects the first plate section and the second plate section.

13 Claims, 7 Drawing Sheets

(56) References Cited

U.S. PATENT DOCUMENTS

| | | | |
|---|---|---|---|
| 3,426,818 A * | 2/1969 | Derby | 411/175 |
| 4,202,390 A * | 5/1980 | Schenk | 411/105 |
| 4,243,086 A * | 1/1981 | Kuttler et al. | 411/174 |
| 4,293,984 A * | 10/1981 | Kaufmann, Jr. | 411/553 |
| 4,333,211 A * | 6/1982 | Gunther | 411/554 |
| 4,714,392 A * | 12/1987 | Muller et al. | 411/175 |
| 4,755,090 A * | 7/1988 | Macfee et al. | 411/82 |
| 4,826,375 A * | 5/1989 | Holton | 411/174 |
| 5,695,296 A | 12/1997 | Miura | |
| 5,713,707 A * | 2/1998 | Gagnon | 411/175 |
| 2001/0041113 A1* | 11/2001 | Antonucci et al. | 411/553 |
| 2007/0011844 A1 | 1/2007 | Aoki et al. | |
| 2009/0183960 A1 | 7/2009 | Ikeda et al. | |

FOREIGN PATENT DOCUMENTS

| | | |
|---|---|---|
| JP | H06-017814 A | 1/1994 |
| JP | H08-068414 A | 3/1996 |
| JP | 8-226420 A | 9/1996 |
| JP | 2008-180268 A | 8/2008 |
| JP | 2009-168177 A | 7/2009 |

OTHER PUBLICATIONS

Chinese Office Action dated Jul. 1, 2015 with an English translation.
Japanese Office Action dated Aug. 4, 2015 with an English Translation.

* cited by examiner

CLIP AND MEMBER MOUNTING STRUCTURE WITH SAME

TECHNICAL FIELD

The present invention relates to a clip for locking a pin, and a mounting structure including the clip.

BACKGROUND ART

To connect two panels, there is known a mounting structure in which a thin-plate nut is mounted to an edge of a plate, and a screw mounted with the other panel is inserted into holes of the panel and the thin-plate nut (for example, see Patent Document 1), thereby connecting the two panels.

Patent Document 1 discloses a threaded screw, and a thin-plate nut including a screw hole that can be threadably mountable with the screw. The thin-plate nut includes a first plate portion which has a screw insertion hole and a second plate portion which has a screw hole and is connected to the first plate portion via a bent portion. The thin-plate nut pinches an edge of one panel between the first plate portion and the second plate portion. The screw is attached to the other panel, and then threadably mounted to the screw hole of the thin-plate nut, thereby connecting the two panels.

CITATION LIST

Patent Literature

Patent Document 1
JP-2008-180268-A

SUMMARY OF THE INVENTION

Problem that the Invention is to Solve

In the technique of Patent Document 1, after the screw is threadably mounted to the thin-plate nut, depending on circumstances, the screw may be adhered to the thin-plate nut. When the screw is rotated to dismount the panel in the state where the screw has been adhered to the thin-plate nut, the thin-plate nut may be rotated together with the screw. In this case, the threadably mounting may not to be easily released, thereby deteriorating efficiency of dismounting operation.

The present invention is made in view of the above problem, and an object of the present invention is to provide a mounting structure that allows easy mounting operation and dismounting operation.

Means for Solving the Problem

In order to solve the problem described above, one embodiment of the present invention provides a mounting structure for connecting a first member including a first mounting hole and a second member including a second mounting hole. The mounting structure includes: a pin including a shaft portion and a radially-protruding portion that protrudes from the shaft portion in a radial direction; and a clip that is stamped out of one metallic plate and that is arranged to pinch the first member. The clip includes: a first plate portion including a first insertion hole into which the shaft portion of the pin is inserted; a second plate portion facing the first plate portion; and a connecting portion connecting the first plate portion and the second plate portion. The second plate portion includes a pin-locking portion including a second insertion hole into which the radially-protruding portion is insertable so that the radially-protruding portion can be locked. The pin-locking portion includes a rising portion that is inclined so as to be away from the first plate portion and a concave portion that is provided at a top of the pin-locking portion and that is dent toward the first plate portion. In a mounting state, the radially-protruding portion is locked by being accommodated into the concave portion.

According to the present embodiment, because the clip can be produced by being stamped out of one metallic plate, the production cost can be reduced. Because the pin can be mounted to the clip such that the radially-protruding portion of the pin is locked by being accommodated into the concave portion of the clip, the mounting can be easily performed while the locking can be easily released.

Another embodiment of the present invention is related to a clip. There is provided a clip that is stamped out of one metallic plate, that is to be mounted to an edge of a first member and that can lock a pin to which a second member is mounted. The clip including a first plate portion including a first insertion hole into which a shaft portion of the pin is inserted; a second plate portion facing the first plate portion; and a connecting portion connecting the first plate portion and the second plate portion. The second plate portion includes a pin-locking portion including a second insertion hole into which a radially-protruding portion provided to the shaft portion of the pin is inserted so that the radially-protruding portion can be locked. The pin-locking portion includes a rising portion that is inclined so as to be away from the first plate portion and a concave portion that is provided at a top of the pin-locking portion and that is dent toward the first plate portion. In a mounting state, the radially-protruding portion is locked by being accommodated into the concave portion.

According to the present embodiment, because the clip can be produced by being stamped out of one metallic plate, the production cost can be reduced. Because the pin can be mounted to the clip such that the radially-protruding portion of the pin is locked by being accommodated into the concave portion of the clip, the mounting can be easily performed while the locking can be easily released.

Advantageous Effects of Invention

According to the present invention, mounting operation and dismounting operation can be easily performed in the mounting structure.

MODE FOR CARRYING OUT THE INVENTION

Figure 1A:
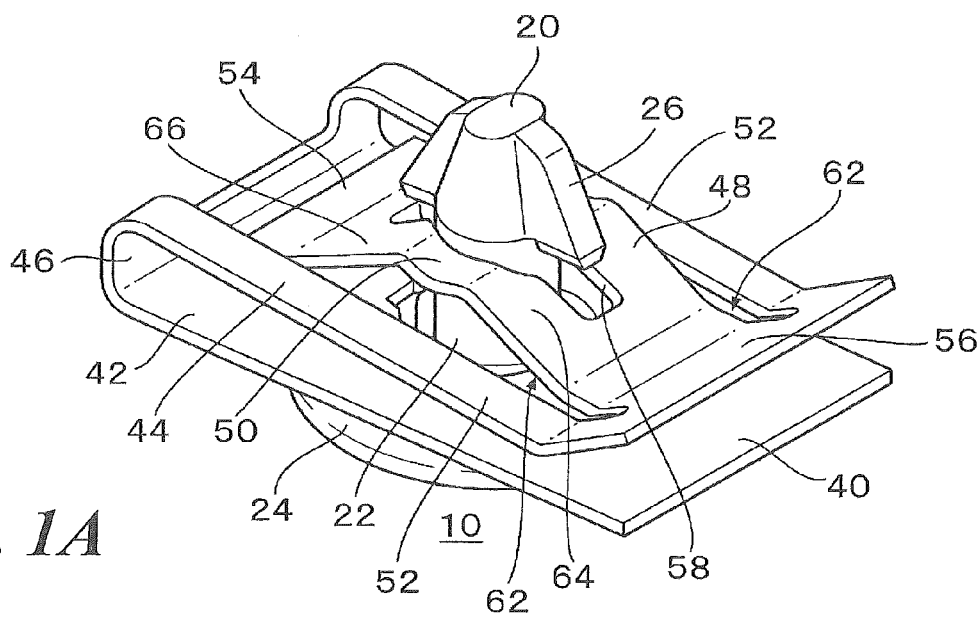
FIG. 1A and FIG. 1B are explanatory views of a mounting structure according to an embodiment of the present invention.
Figure 1B:
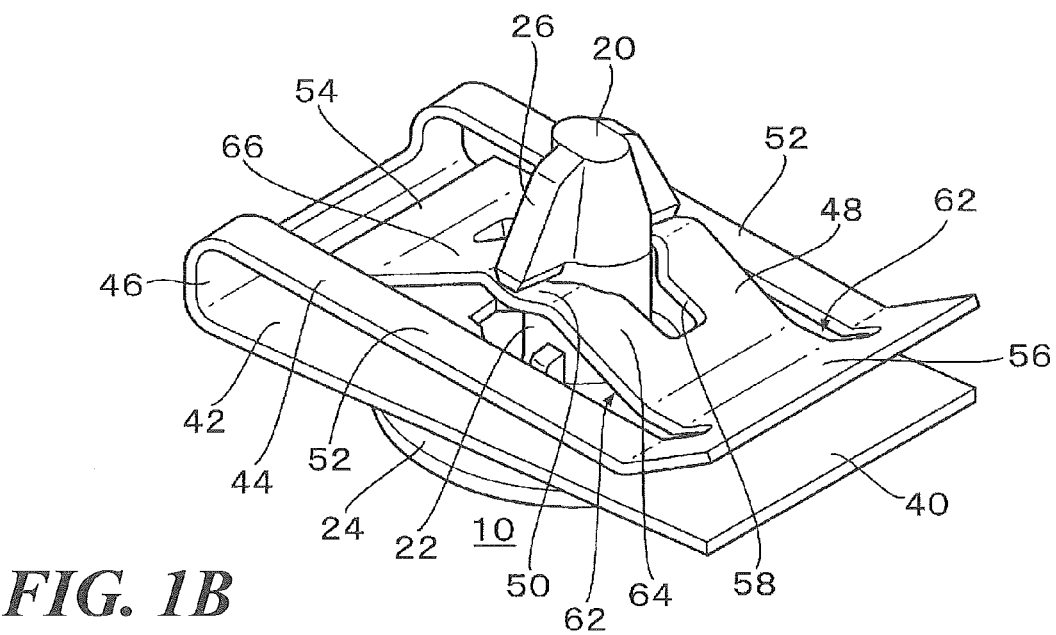

FIG. 1A and FIG. 1B are explanatory views of a mounting structure 10 according to an embodiment of the present invention. FIG. 1A is a perspective view of the mounting structure 10 before a locking state, and FIG. 1B is a perspective view of the mounting structure 10 in the locking state. The mounting structure 10 is used to connect a first member and a second member, although there are not illustrated hereto. For example, the first member is a cover provided to a vehicle body, and the second member is a lid connected to the cover and removed therefrom at the time of oil change.

The mounting structure 10 includes at least a pin 20 and a clip 40. The clip 40 is mounted to pinch an edge of the first member, and the pin 20 to which the second member is mounted is locked to the clip 40 by being inserted into the clip 40 and the first member, thereby connecting the first member and the second member. Plural mounting structures 10 may be used to connect the first member and the second member. Descriptions of constructional members of the pin 20 and the clip 40 will be provided referring to the following drawings.

Figure 2A:
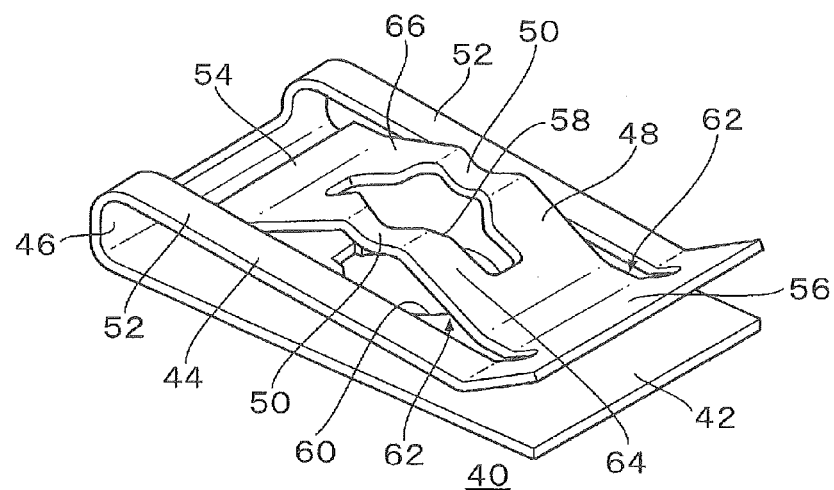
FIG. 2A is a perspective view of a clip.
Figure 2B:
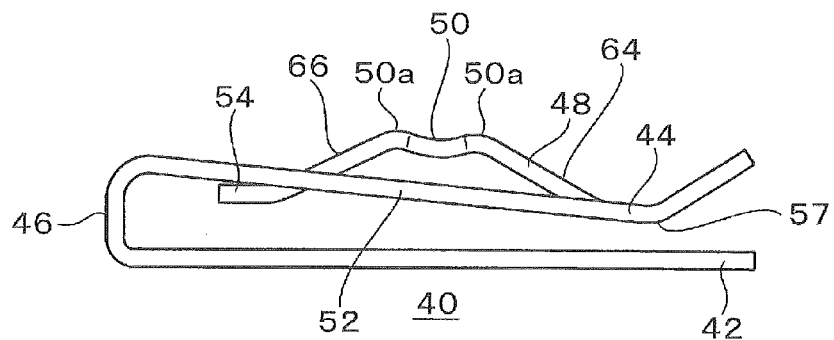
FIG. 2B is a side view of the clip.
Figure 2C:
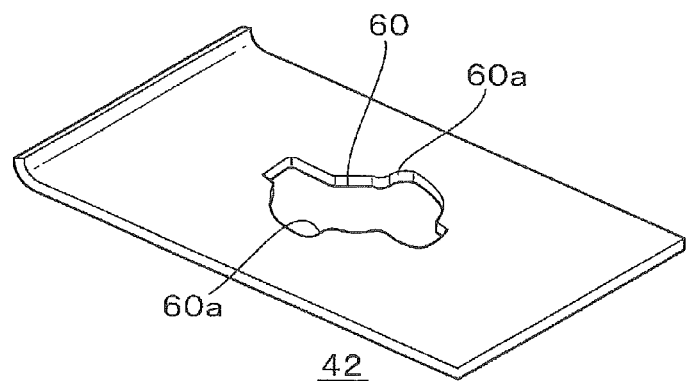
FIG. 2C is a perspective view of a part of the clip.

FIG. 2A is a perspective view of the clip 40, FIG. 2B is a side view of the clip 40, and FIG. 2C is a perspective view of a part of the clip 40. The clip 40 is produced by being stamped out of one metallic plate, thereby facilitating the working and reducing the production cost. The clip 40 includes a first plate portion 42, a second plate portion 44 and a connecting portion 46 The first plate portion 42 includes a first insertion hole 60 into which a shaft portion 22 of the pin 20 is inserted. The second plate portion 44 is provided to face the first plate portion 42. The connecting portion 46 connects the first plate portion 42 and the second plate portion 44.

The first plate portion 42 has a flat plate shape, and includes the first insertion hole 60 at its center. The first insertion hole 60 includes a limiting portion 60a arranged to limit the rotation of the pin 20. The connecting portion 46 is provided with an elasticity so that the first plate portion 42 and the second plate portion 44 are expandably connected according to the elasticity.

The second plate portion 44 includes a pair of outer frame portions 52, an expansion portion 56 arranged to connect the pair of outer frame portions 52, and a pin-locking portion 48 extending from the expansion portion 56 toward the connecting portion 46. One ends of the outer frame portions 52 are respectively connected to both ends of the connecting portion 46 while the other ends of the outer frame portions 52 are respectively connected to both ends of the expansion portion 56. The pair of outer frames 52 are supported rotatable by the connecting portion 46.

The expansion portion 56 is formed such that the space between the expansion portion 56 and the first plate portion 42 are expandable from the side of the other ends of the outer frame portions 52, that is, from a base end of the second plate portion 44 toward the free end of the second plate portion 44. Thus, the edge of the first member can be easily inserted. The expansion portion 56 may rotatably support the pin-locking portion 48. The pin-locking portion 48 is disposed between the pair of outer frame portions 52 via slits 62.

The pin-locking portion 48 includes a second insertion hole 58 having a long hole shape at its center. The pin-locking portion 48 defines a cantilever piece extending from the side of the other ends of the outer frame portions 52 toward the connecting portion 46, and includes a rising portion 64 supported by the expansion portion 56, a downward-inclined portion 66 including a free end portion 54, and a concave portion 50 connected to the rising portion 64 and the downward-inclined portion 66. Including the free end portion, the pin-locking portion 48 can be easily shaped into a mound. Shaping the pin-locking portion 48 into a mound can dispose the concave portion 50 so as to be movable up and down. The free end portion 54 is provided on the opposite side to the expansion portion 56, and is configured to avoid hooking by the first member upon insertion of the first member.

As shown in FIG. 2B, the rising portion 64 is inclined from one end of the second plate portion 44, that is, from the expansion portion 56 so as to be away from the first plate portion 42. The downward-inclined portion 66 is inclined so as to approach the first plate portion 42 from the concave portion 50. The concave 50 is provided at the top of the pin-locking portion 48, and has a shape of being dent toward the first plate portion 42. As shown in FIG. 2C, the first insertion hole 60 provided in the first plate portion 42 is shaped so that radially-protruding portions 26 and the shaft portion 22 of the pin 20 are insertable.

The concave portion 50 is disposed close to facing long sides of the second insertion hole 58. Thus, the length in the longitudinal direction of the clip 40 can be reduced. The concave portion 50 is disposed at the top of the pin-locking portion 48, and is movable up and down.

Figure 3A:
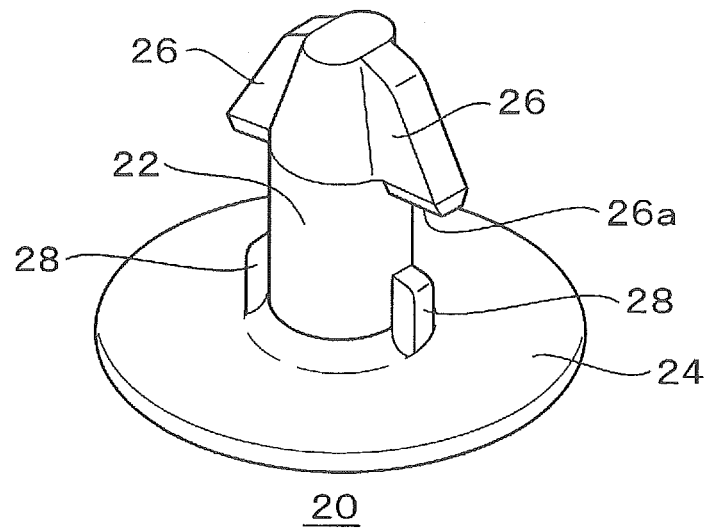
FIG. 3A is a perspective view of a pin.
Figure 3B:
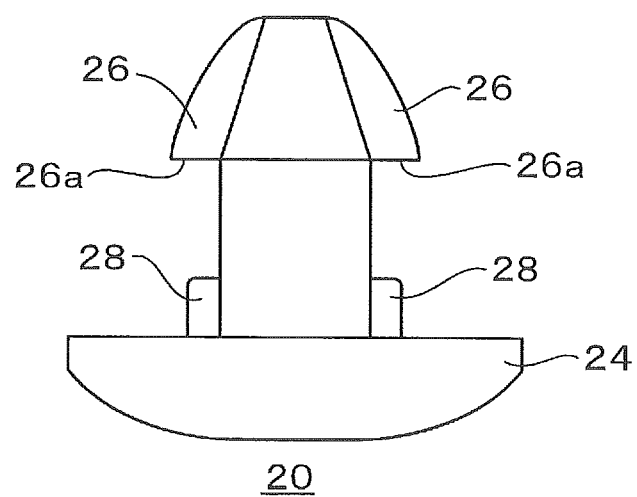
FIG. 3B is a side view of the pin.

FIG. 3A is a perspective view of the pin 20, and FIG. 3B is a side view of the pin 20. The pin 20 includes the shaft portion 22, a head portion 24, the radially-protruding portions 26, and a projection portion 28. The shaft portion 22 has a columnar shape. The head portion 24 is provided at one end of the shaft portion 22, and has a flange shape.

The pair of radially-protruding portions 26 protrude from the other end of the shaft portion 22 in the radial direction. The projection portion 28 is provided around the shaft portion 22 on the side of the head portion 24. The projection portion 28 provided around the shaft portion 22 on the side of the head portion 24 may be embodied as a projection portion provided only on the head portion 24. The lower ends of the radially-protruding portions 26 define locked surfaces 26a locked to the pin-locking portion 48.

Figure 4:
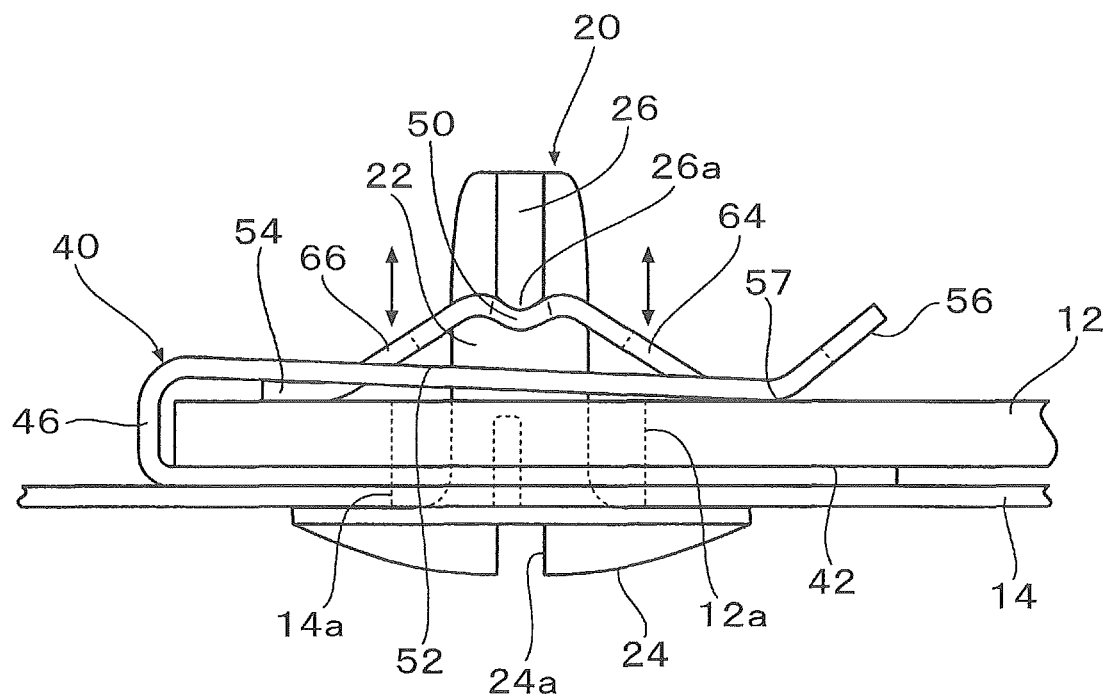
FIG. 4 is a side view of the mounting structure in the state of being mounted to a first member and a second member.

FIG. 4 is a side view of the mounting structure 10 in the state of being mounted to a first member 12 and a second member 14. The clip 40 is mounted to hold the first member 12 between the first plate portion 42 and the second plate portion 44. The second member 14 is held between the first plate portion 42 of the clip 40 and the head portion 24 of the pin 20. Being pressed at two positions of a holding portion 57 and the free end portion 54, the second member 14 can be prevented from rattling.

First, positional alignment between a first mounting hole 12a of the first member 12, and the first insertion hole 60 and the second insertion hole 58 of the clip 40 is performed so that the clip 40 is mounted to a first member 12 on the edge. Then, while the shaft portion 22 of the pin 20 is inserted into the second mounting hole 14a of the second member 14, that is, while the shaft portion 22 protrudes from the second mounting hole 14a, the shaft portion 22 is inserted into the first insertion hole 60 and the first mounting hole 12a.

At this time, in a state where the radially-protruding portions 26 have been inserted into the first mounting hole 12a have not yet been locked to the concave portion 50, the locked surfaces 26a of the radially-protruding portions 26 are located closer to the first plate portion 42 as compared with an upper end 50a of the concave portion 50. Hence, the concave portion 50 needs to be pressed down in order to lock the locked surfaces 26a to the concave portion 50.

After the insertion of the shaft portion 22, a jig is fitted into a groove portion 24a provided to the head portion 24, and then, the pin 20 is rotated. The pin-locking portion 48 is elastic and flexible. When the pin-locking portion 48 deforms, the free end portion 54 moves in the longitudinal direction. When the pin 20 is rotated to lock the radially-protruding portions 26 to the concave portion 50, the radially-protruding portions 26 press down the upper end 50a of the concave portion 50 toward the first plate 42 to climb over the upper end 50a. At this time, an operational feeling can be provided to the user. When the radially-protruding portions 26 climb over the upper end 50a of the concave portion 50, the pin-locking portion 48 deforms such that the free end portion 54 moves in the longitudinal direction. A provision of the free end portion facilitates the deformation of the pin-locking portion 48, so that the locking between the concave portion 50 and the radially-protruding portions 26 can be easily achieved and can be easily released.

The radially-protruding portions 26 are locked by being accommodated into the concave portion 50 in the mounting state. Thus, the locking of the mounting structure 10 can be completed by half or less rotation of the pin 20, so that mounting operation can be easily performed compared with the case of fastening with a screw. The mounting is made using the elasticity of the pin-locking portion 48 itself, so that a rattle can be prevented in the mounting state.

In releasing the locking between the radially-protruding portions 26 and the concave portion 50, the pin 20 is rotated to rotate the radially-protruding portions 26 to press down the concave portion 50, and the locking is released. Then, the pin 20 is rotated so as to align the radially-protruding portions 26 with the second insertion hole 58 having a long hole shape, and the radially-protruding portions 26 can be pulled out of the second insertion hole 58 and removed. Thus, the operation can be easily performed compared with the case of fastening with a screw.

Figure 5A:
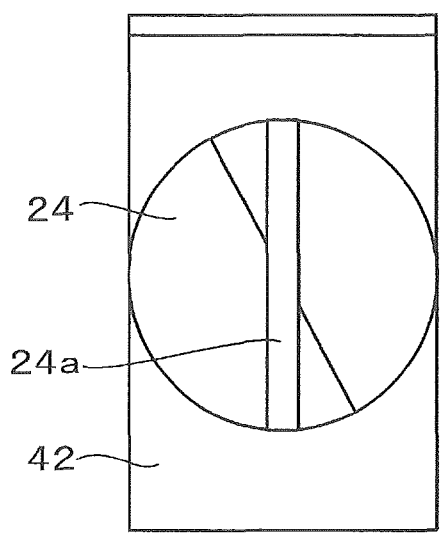
FIGS. 5A to 5D are explanatory views for illustrating the function of limiting the rotation of the pin.
Figure 5B:
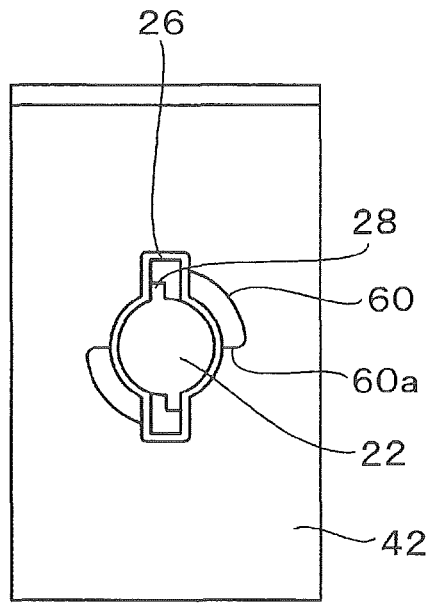
Figure 5C:
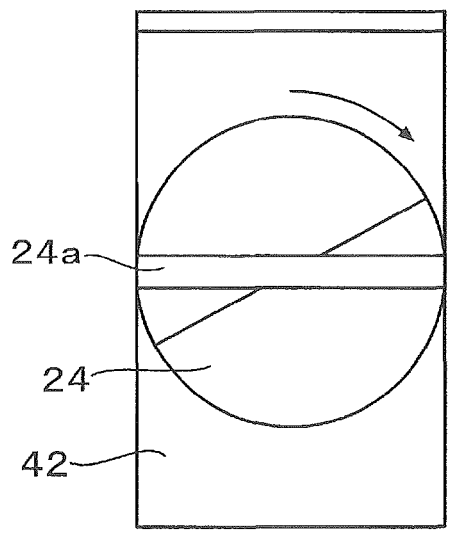
Figure 5D:
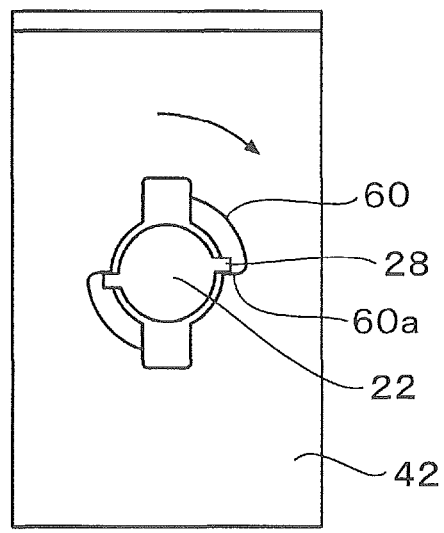

FIG. 5A to FIG. 5D are explanatory views for illustrating the function of limiting the rotation of the pin 20. Shown in FIG. 5A and FIG. 5C are views of the mounting structure 10 seen from the side of the head portion 24. A jig such as a flat-blade screwdriver is fitted into the groove portion 24a of the head portion 24 to rotate the pin 20. Shown in FIG. 5B and FIG. 5D are views of the mounting structure 10 where the head portion 24 is eliminated. The first insertion hole 60 of the first plate portion 42 is shaped in accordance with the shapes of the radially-protruding portions 26 and the shaft portion 22.

Shown in FIG. 5A and FIG. 5B is a state where the pin 20 has been inserted into the first insertion hole 60 but has not yet been rotated and mounted. Shown in FIG. 5C and FIG. 5D is a state where mounting of the pin 20 is completed.

The first insertion hole 60 of the first plate portion 42 includes the limiting portion 60a arranged to limit the rotation of the projection portion 28. When the pin 20 is rotated approximately ninety degrees, the projection portion 28 is brought into contact with the limiting portion 60a as shown in FIG. 5D, and the rotation of the pin 20 is limited. In rotating the pin 20 to mount, the projection portion 28 is brought into contact with the limiting portion 60a to stop the rotation of the pin 20 when the concave portion 50 locks the radially-protruding portions 26. This configuration prevents the user from excessively rotating the pin 20 at the time of the mounting, and can thus limit the pin 20 so as not to overshoot the locking state to release the locking. Providing the limiting portion 60a to the first plate portion 42 can downsize the second plate portion 44 compared with the case where the limiting portion 60a is provided to the second plate portion 44.

Figure 6A:
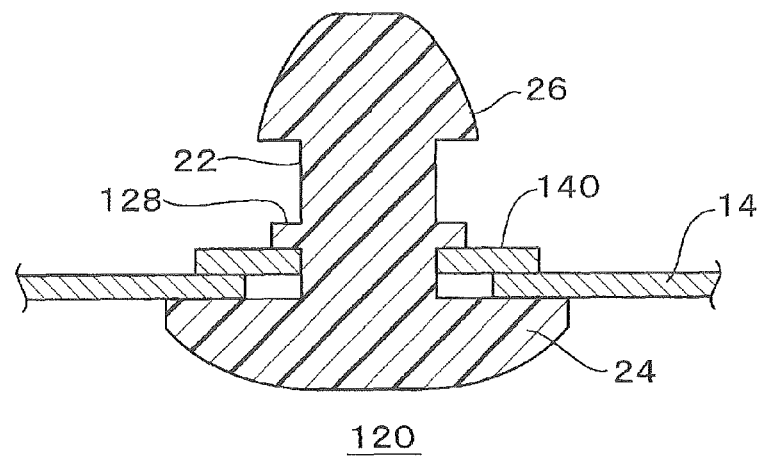
FIG. 6A and FIG. 6B are explanatory views for illustrating the configuration of sub-assembling a pin according to a modified embodiment to the second member.
Figure 6B:
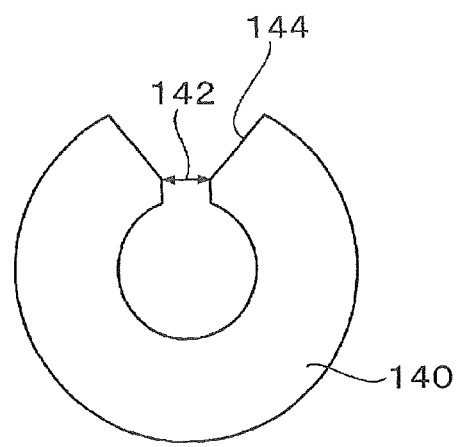

FIG. 6 are explanatory views for illustrating the configuration of sub-assembling a pin 120 according to a modified embodiment to the second member 14. FIG. 6A is a cross-sectional view of the pin 20 sub-assembled to the second member 14 by a C-shaped ring 140. FIG. 6B is a front view of the C-shaped ring 140. The pin 120 according to the modified embodiment is different in projection portion 128 from the pin 20 shown in FIG. 3 while being same in other configurations.

The projection portion 128 is provided on the outer periphery of the shaft portion 22 apart from the head portion 24. The C-shaped ring 140 has an outer diameter larger than the second mounting hole of the second member 14. The C-shaped ring 140 has an inner diameter approximately same as the outer diameter of the shaft portion 22. Movement in the axial direction of the C-shaped ring 140 toward the radially-protruding portions 26 is limited by the projection portion 128 protruding from the outer periphery of the shaft portion 22. In a similar manner that the projection portion 28 is brought into contact with the limiting portion 60a of the first insertion hole 60 as shown in FIG. 5D, the rotation of the pin 120 is limited when the projection portion 128 is brought into contact with the limiting portion 60a.

The C-shaped ring 140 is mounted to the shaft portion 22 through a slit 142 of the C-shaped ring 140 while surrounding the outer periphery of the shaft portion 22. An opening portion 144 widened toward the outer periphery is provided on the outer side in the radial direction of the slit 142. The smallest width of the slit 142 is smaller than the outer diameter of the shaft portion 22 and the width of the projection portion 128. Thus, the C-shaped ring 140 is configured such that the shaft portion 22 cannot be easily pulled out of the slit 142 once the C-shaped ring 140 is attached to the shaft portion 22.

The C-shaped ring 140 is disposed between the projection portion 128 and the head portion 24. The pin 20 can be mounted to the second member 14 in advance such that the second member 14 is held between the head portion 24 and the C-shaped ring 140. Thus, even when the locking of the mounting structure 10 is released in order to dismount the second member 14 from the first member 12, the pin 20 is still mounted to the second member 14, thereby facilitating the dismounting operation.

Figure 7:
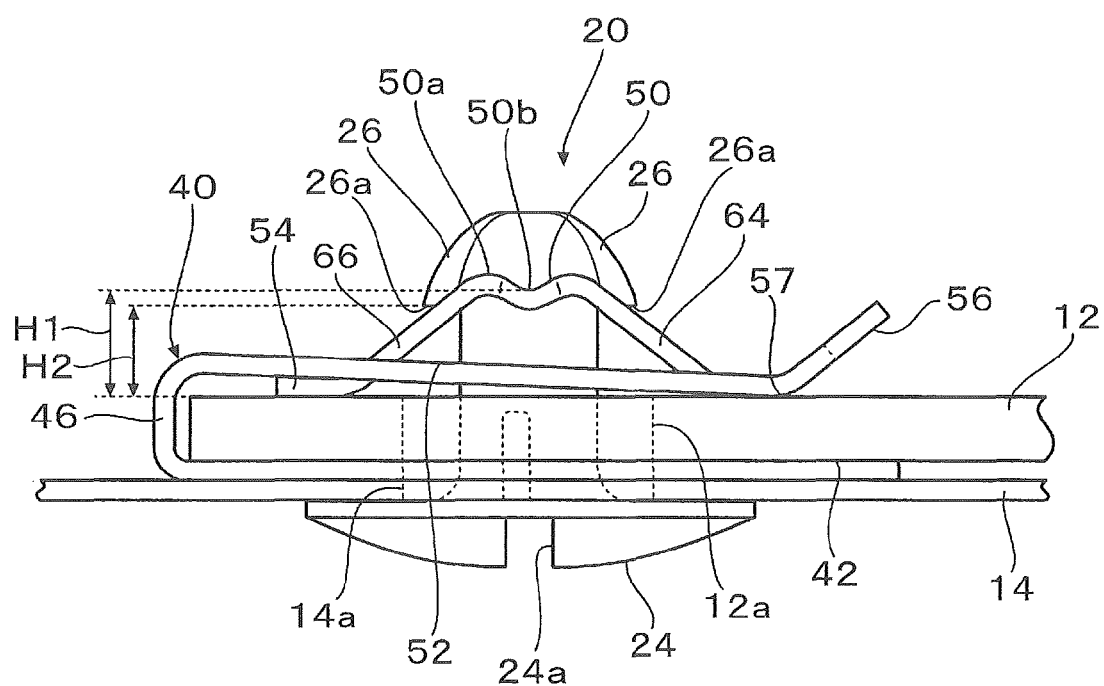
FIG. 7 is a side view of the mounting structure that has not yet been mounted to the first member and the second member.

FIG. 7 is a side view of the mounting structure 10 that has not yet been mounted to the first member 12 and the second member 14. Shown in FIG. 7 is a state where the radially-protruding portions 26 have been inserted into the first mounting hole 12a, the back surface of the head portion 24 has been brought into contact with the second member 14, and the second member 14 has been brought into contact with the first plate portion 42, but the radially-protruding portions 26 have not yet been locked to the concave portion 50. That is, it is the state where the radially-protruding portions 26 have been inserted into the second insertion hole 58 of the pin-locking portion 48, but the pin 120 has not yet been rotated.

In this state, the locked surfaces 26a of the radially-protruding portions 26 are located closer to the first member 12 as compared with a bottom surface 50b of the concave portion 50. The bottom surface 50b defines a contact surface to be brought into contact with the locked surfaces 26a. A space H1 between the bottom surface 50b of the concave portion 50 and the first member 12 is larger than a space H2 between the locked surfaces 26a of the radially-protruding portions 26 and the first member 12 as shown in FIG. 7. Thus, when mounting is performed by locking the radially-protruding portions 26 to the concave portion 50, the pin-locking portion 48 can be pressed against the first member 12 by the radially-protruding portions 26. Therefore, the mounting structure 10 can be prevented from rattling in the mounting state. Because the pin-locking portion 48 is configured to be deformed by being pressed against the first member 12, even when the thicknesses of the first member 12 and the second member 14 change, the first member 12 and the second member 14 can be mounted because the pin-locking portion 48 can absorb the displacement in length in the axial direction.

The present invention is not limited to the embodiments described above, and it is also possible to add modifications such as various kinds of design changes to the embodiments based on the knowledge of those skilled in the art. Embodiments to which such modifications are added can also be included within the scope of the present invention.

DESCRIPTION OF REFERENCE NUMERALS AND SIGNS

10 Mounting structure
12 First member
12a First mounting hole
14 Second member
14a Second mounting hole
20 Pin
22 Shaft portion
24 Head portion
24a Groove portion
26 Radially-protruding portion
26a Locked surface
28 projection portion
40 Clip
42 First plate portion
44 Second plate portion
46 Connecting portion
48 Pin-locking portion
50 Concave portion
52 Outer frame portion
54 Free end portion
56 Expansion portion
57 Holding portion
58 Second insertion hole
60 First insertion hole
60a Limiting portion
62 Slit
64 Rising portion
66 Downward-inclined portion
140 C-shaped ring

INDUSTRIAL APPLICABILITY

The present invention relates to a clip for locking a pin, and a mounting structure including the clip, and provides a technique for achieving easy mounting operation and dismounting operation.

The invention claimed is:

1. A mounting structure for connecting a first member comprising a first mounting hole and a second member comprising a second mounting hole, the mounting structure comprising:
   a pin comprising a shaft portion and a radially-protruding portion that protrudes from the shaft portion in a radial direction; and
   a clip that is stamped out of one metallic plate and that is arranged to pinch the first member,
   wherein the clip comprises:
      a first plate portion comprising a first insertion hole into which the shaft portion of the pin is inserted;
      a second plate portion facing the first plate portion; and
      a connecting portion connecting the first plate portion and the second plate portion,
   wherein the second plate portion comprises a pin-locking portion comprising a second insertion hole into which the radially-protruding portion is insertable so that the radially-protruding portion can be locked,
   wherein the pin-locking portion comprises:
      a rising portion that is inclined so as to be away from the first plate portion;
      a concave portion that is provided at an end of the rising portion and that is dented toward the first plate portion, and is flexible; and
      a downward-inclined portion that is connected to an end of the concave portion opposite the end of the rising portion and is declined towards the first plate portion,
   wherein, in a state where the radially-protruding portion has been inserted into the second insertion hole but the pin has not yet been rotated, a locked surface of the radially-protruding portion is located closer to the first plate portion as compared with a bottom surface of the concave portion,
   wherein, when the pin is rotated to thereby rotate and lock the radially-protruding portion to the concave portion, the radially-protruding portion presses down an upper end of the concave portion toward the first plate portion to thereby climb over the upper end,
   wherein, in a mounting state, the radially-protruding portion is locked by being accommodated into the concave portion,
   wherein the second plate portion further comprises:
      a pair of outer frames having first ends connected to the connecting portion; and
      an expansion portion connected to second ends of the pair of outer frames, and
   wherein a center portion of the expansion portion is connected to another end of the rising portion and is inclined away from the rising portion.

2. The mounting structure of claim 1,
   wherein the second plate portion comprises a pair of outer frames having first ends connected to the connecting portion, and
   wherein the downward-inclined portion comprises a cantilever piece extending from a side of the other ends of the outer frames toward the connecting portion, and disposed between the pair of outer frames via slits.

3. The mounting structure of claim 1,
   wherein the second insertion hole has a long hole shape, and
   wherein the concave portion is disposed close to facing long sides of the second insertion hole.

4. The mounting structure of claim 1, wherein an end of the second plate portion is inclined away from the first plate portion.

5. The mounting structure of claim 1, wherein a distal end of the downward-inclined portion has a different slope from that of the downward-inclined portion.

6. The mounting structure of claim 1, wherein a distal end of the downward-inclined portion is below a bottom surface of the second plate portion.

7. A mounting structure for connecting a first member comprising a first mounting hole and a second member comprising a second mounting hole, the mounting structure comprising:
   a pin comprising a shaft portion and a radially-protruding portion that protrudes from the shaft portion in a radial direction; and
   a clip that is stamped out of one metallic plate and that is arranged to pinch the first member,
   wherein the clip comprises:
      a first plate portion comprising a first insertion hole into which the shaft portion of the pin is inserted;

a second plate portion facing the first plate portion; and
a connecting portion connecting the first plate portion and the second plate portion,
wherein the second plate portion comprises a pin-locking portion comprising a second insertion hole into which the radially-protruding portion is insertable so that the radially-protruding portion can be locked,
wherein the pin-locking portion comprises a rising portion that is inclined so as to be away from the first plate portion and a concave portion that is provided at a top of the pin-locking portion and that is dented toward the first plate portion,
wherein, in a mounting state, the radially-protruding portion is locked by being accommodated into the concave portion,
wherein the pin comprises:
  a head portion having a flange shape at one end of the shaft portion; and
  a projection portion protruding from at least one of a back surface of the head portion and a periphery of the shaft portion on a side of the head portion, and
wherein the first insertion hole of the first plate portion comprises a limiting portion having a first surface perpendicular to the shaft portion so as to contact a surface of the projection portion to stop a rotation of the projection portion.

8. The mounting structure of claim 7, further comprising:
a C-shaped ring that is mounted to surround the periphery of the shaft portion at a position between the projection portion and the head portion,
wherein the projection portion is provided on the periphery of the shaft portion apart from the head portion, and
wherein the pin is mounted to the second member such that the second member is held between the head portion and the C-shaped ring.

9. The clip of claim 7, wherein the pin further comprises a second projection portion protruding from the shaft portion.

10. A clip that is stamped out of one metallic plate, that is to be mounted to an edge of a first member and that can lock a pin to which a second member is mounted, the clip comprising:
a first plate portion comprising a first insertion hole into which a shaft portion of the pin is inserted;
a second plate portion facing the first plate portion; and
a connecting portion connecting the first plate portion and the second plate portion,
wherein the second plate portion comprises a pin-locking portion comprising a second insertion hole into which a radially-protruding portion provided to the shaft portion of the pin is inserted so that the radially-protruding portion can be locked,
wherein the pin-locking portion comprises:
  a rising portion that is inclined so as to be away from the first plate portion;
  a concave portion that is provided at an end of the rising portion and that is dented toward the first plate portion, and is flexible; and
  a downward-inclined portion that is connected to an end of the concave portion opposite the end of the rising portion and is declined towards the first plate portion,
wherein, in a state where the radially-protruding portion has been inserted into the second insertion hole but the pin has not yet been rotated, a bottom surface of the concave portion is located far away from the first plate portion as compared with a locked surface of the radially-protruding portion,
wherein, when the pin is rotated to thereby rotate and lock the radially-protruding portion to the concave portion, the upper end of the concave portion is pressed down by the radially-protruding portion toward the first plate portion,
wherein, in a mounting state, the radially-protruding portion is locked by being accommodated into the concave portion,
wherein the second plate portion further comprises:
  a pair of outer frames having first ends connected to the connecting portion; and
  an expansion portion connected to second ends of the pair of outer frames, and
wherein a center portion of the expansion portion is connected to another end of the rising portion and is inclined away from the rising portion.

11. The mounting structure of claim 10, wherein an end of the second plate portion is inclined away from the first plate portion.

12. The mounting structure of claim 10, wherein a distal end of the downward-inclined portion has a different slope from that of the downward-inclined portion.

13. The mounting structure of claim 10, wherein a distal end of the downward-inclined portion is below a bottom surface of the second plate portion.

* * * * *